(12) United States Patent
Eckert et al.

(10) Patent No.: US 10,625,719 B2
(45) Date of Patent: Apr. 21, 2020

(54) METHOD FOR ADJUSTING BRAKE PRESSURES ON PNEUMATICALLY ACTUATED WHEEL BRAKES OF A VEHICLE, BRAKE SYSTEM FOR CARRYING OUT THE METHOD, AND VEHICLE

(71) Applicant: WABCO GmbH, Hannover (DE)

(72) Inventors: Horst Eckert, Rehburg-Loccum (DE); Florian Schwagmeyer, Heuerssen (DE)

(73) Assignee: WABCO GMBH, Hannover (DE)

( * ) Notice: Subject to any disclaimer, the term of this patent is extended or adjusted under 35 U.S.C. 154(b) by 70 days.

(21) Appl. No.: 15/769,344

(22) PCT Filed: Nov. 7, 2016

(86) PCT No.: PCT/EP2016/001837
§ 371 (c)(1),
(2) Date: Apr. 19, 2018

(87) PCT Pub. No.: WO2017/097389
PCT Pub. Date: Jun. 15, 2017

(65) Prior Publication Data
US 2018/0304871 A1  Oct. 25, 2018

(30) Foreign Application Priority Data

Dec. 9, 2015  (DE) .................. 10 2015 015 922

(51) Int. Cl.
*B60T 8/1766*  (2006.01)
*B60T 8/17*  (2006.01)
(Continued)

(52) U.S. Cl.
CPC .......... *B60T 8/1708* (2013.01); *B60T 8/1766* (2013.01); *B60T 8/17554* (2013.01); *B60T 8/268* (2013.01); *B60T 8/327* (2013.01); *B60T 13/683* (2013.01)

(58) Field of Classification Search
CPC .. B60T 8/1708; B60T 8/17554; B60T 8/1766; B60T 8/268; B60T 8/327;
(Continued)

(56) References Cited

U.S. PATENT DOCUMENTS 5,011,236 A * 4/1991 Toepfer .................... B60T 8/00
                                                     303/128
5,163,742 A    11/1992 Toepfer et al.
(Continued)

FOREIGN PATENT DOCUMENTS

| DE | 3829951 A1 | 3/1990 |
| DE | 102009058154 A1 | 6/2011 |
| DE | 102011118130 A1 | 5/2013 |

*Primary Examiner* — Thomas W Irvin
(74) *Attorney, Agent, or Firm* — Leydig, Voit & Mayer, Ltd.

(57) ABSTRACT

A method for adjusting brake pressures on pneumatically actuated wheel brakes of a vehicle includes, in a normal braking mode, continuously determining, by the brake control unit, at least one differential slip value as a difference between slip values of two wheels or axles of the vehicle, and determining, by the brake control unit, an interaxle braking distribution index for a relevant pair of axles by an assessment of a change in the at least one differential slip value within an evaluation interval. The method further includes, in a pressure control mode, using, by the brake control unit, the interaxle braking distribution index that is determined in the normal braking mode for the weighting of the control signals for the respective pair of axles.

20 Claims, 3 Drawing Sheets

(51) Int. Cl.
 *B60T 8/1755* (2006.01)
 *B60T 8/26* (2006.01)
 B60T 8/32 (2006.01)
 B60T 13/68 (2006.01)

(58) Field of Classification Search
 CPC ...... B60T 13/683; B60T 8/1761; B60T 8/171; B60T 8/172
 See application file for complete search history.

(56) References Cited

U.S. PATENT DOCUMENTS

| | | | | |
|---|---|---|---|---|
| 5,178,231 | A * | 1/1993 | Watanabe | B60K 23/0808 180/197 |
| 6,009,366 | A | 12/1999 | Burkhard et al. | |
| 6,915,199 | B2 * | 7/2005 | Fujioka | B62D 6/005 701/70 |
| 8,600,637 | B2 * | 12/2013 | Hamada | B60T 8/17616 180/197 |
| 8,689,920 | B2 * | 4/2014 | Matsuda | B60K 28/16 180/197 |
| 8,775,047 | B2 * | 7/2014 | Breuer | B60T 7/22 340/435 |
| 9,227,605 | B2 * | 1/2016 | Okubo | B60T 8/172 |
| 9,233,672 | B2 * | 1/2016 | Matsuda | B60T 8/175 |
| 9,327,695 | B2 * | 5/2016 | Lauser | B60T 7/042 |
| 9,573,473 | B2 * | 2/2017 | Akiyama | B60L 3/102 |
| 10,239,505 | B2 * | 3/2019 | Boethel | B60T 8/1708 |
| 2004/0260446 | A1 * | 12/2004 | Hamada | B60T 8/17616 701/70 |
| 2005/0001477 | A1 | 1/2005 | Mederer et al. | |
| 2006/0108170 | A1 * | 5/2006 | Ishikawa | B60T 8/171 180/282 |
| 2009/0134698 | A1 | 5/2009 | Herges | |
| 2011/0155100 | A1 * | 6/2011 | Matsuda | B60K 28/16 123/406.19 |
| 2011/0160977 | A1 * | 6/2011 | Matsuda | B60T 8/1706 701/85 |
| 2012/0203438 | A1 | 8/2012 | Breuer et al. | |
| 2012/0323460 | A1 * | 12/2012 | Okubo | B60T 8/172 701/74 |
| 2015/0046057 | A1 | 2/2015 | Lauser et al. | |
| 2016/0114773 | A1 * | 4/2016 | Mol | B60T 8/171 701/71 |
| 2018/0072290 | A1 * | 3/2018 | Boethel | B60T 8/1708 |
| 2018/0281760 | A1 * | 10/2018 | Watanabe | B60T 8/1769 |
| 2018/0370507 | A1 * | 12/2018 | Eckert | B60T 8/1755 |
| 2019/0105990 | A1 * | 4/2019 | Cho | B60L 7/18 |
| 2019/0143949 | A1 * | 5/2019 | Werner | B60T 7/12 |

* cited by examiner

METHOD FOR ADJUSTING BRAKE PRESSURES ON PNEUMATICALLY ACTUATED WHEEL BRAKES OF A VEHICLE, BRAKE SYSTEM FOR CARRYING OUT THE METHOD, AND VEHICLE

CROSS REFERENCE TO RELATED APPLICATIONS

This application is a U.S. National Stage Application under 35 U.S.C. § 371 of International Application No. PCT/EP2016/001837 filed on Nov. 7, 2016, and claims benefit to German Patent Application No. DE 10 2015 015 922.4 filed on Dec. 9, 2015. The International Application was published in German on Jun. 15, 2017, as WO 2017/097389 A1 under PCT Article 21(2).

FIELD

The invention concerns a method for adjusting brake pressures on pneumatically actuated wheel brakes of a vehicle, a brake system of a vehicle for carrying out such a method, and a vehicle with such a brake system.

BACKGROUND

To decelerate a vehicle, the wheels of the vehicle are braked. In the case of motor vehicles, and in particular in the case of utility vehicles, the wheel brakes of the wheels each comprise a brake cylinder. The desired brake pressure in the brake cylinders can be generated pneumatically.

In a normal braking mode, the brake pressure is adjusted directly by the driver of the motor vehicle. The driver can transmit the driver's braking demand by operating a brake pedal. A service brake valve can be operated by means of the brake pedal and as a result the brake cylinder is supplied from a pressure reservoir.

As an alternative to the normal braking mode, a brake control unit undertakes the adjustment of the brake pressures in a pressure control mode, wherein the brake pressure is adjusted according to the specifications of the brake control unit on detecting corresponding braking requirements. Such braking requirements can for example be the implementation of ride stability functions such as an anti-lock function if the control unit detects the presence of a tendency of certain wheels to lock up. DE 10 2009 058 154 A1 discloses such a brake system, the brake control unit of which moreover undertakes the adjustment of the brake pressure in the pressure control mode for the implementation of external braking demands. External braking demands are independent of the driver's braking demand and are for example specified to the brake control unit by external driver assistance systems. As systems embodied separately from the brake control unit, driver assistance systems output signals according to the desired braking power to the brake control unit of the brake system, for example via a data bus.

In the known brake system, the brake control unit carries out control of the brake system to implement ride stability functions such as anti-locking interventions or even stability control and additional external braking demands. Further, simultaneous driver braking demands are implemented. The external braking demand is specified to the brake control unit as a setpoint deceleration value, i.e. as a value that represents the deceleration of the motor vehicle that is being targeted by the driver assistance function. In a situation in which both at least one external braking demand and a driver's braking demand are to be implemented in the pressure control mode, i.e. the driver is braking in addition to an external braking demand, the brake control unit adjusts the brake pressure on the respective brakes according to a resulting setpoint deceleration value of the vehicle deceleration. In the known brake system, the driver's braking demand and the external braking demand are combined additively. Alternatively, in the known brake system, in a "maximum" mode the brake control unit forms the maximum value from a setpoint deceleration value that is demanded by the brake system internally because of a driver's braking demand and an externally demanded setpoint deceleration value. In this case, an externally demanded braking demand is only adjusted if it is higher than the internal braking demand.

Carrying out the adjustment of the brake pressure in the pressure control mode by a brake control unit in the presence of a tendency to lock up of certain wheels is referred to as an "Anti-lock Braking System" (ABS). I.e. during each braking operation, only a braking force corresponding to the coefficient of friction of the road can be used. If the introduced braking force exceeds the maximum transferable braking force on one or more wheels, said wheels start to lock up, whereby the motor vehicle can be unstable. An Anti-lock Braking System permanently monitors the revolution rate of each wheel by means of measurement signals of revolution rate sensors and determines the respective wheel slip therefrom. This can be carried out for example by comparing the wheel speed that is determined from the wheel revolution rate with a (calculated) vehicle reference speed. If a tendency to lock up the wheel is detected by means of the wheel slip determined in this way, i.e. a specified slip limit is reached or exceeded, the brake controller undertakes control over the adjustment of the brake pressure. In this case, a reduction of the brake pressure is carried out in a first step, in order to then control the brake pressure of the wheel involved along the slip limit. In this case, the braking torque is raised further until a braking torque corresponding to the coefficient of friction of the road is reached. In principle, as a result the motor vehicle is approximately optimally decelerated and at the same time stability and steerability are maintained.

DE 38 29 951 A1 discloses a method for carrying out load-dependent control of the brake pressure on a utility vehicle that uses the components of an existing anti-lock system to thereby implement an automatic load-dependent brake function (ALB) that is acting far below the locking limit in the normal braking mode. With the known method, the brake pressure and thereby the braking force distribution are controlled axle-specifically below the locking limit, wherein interaxle braking force distribution is automatically controlled according to the analysis of the revolution rate signals that is provided by the revolution rate sensors in a slip region below the region in which the anti-lock function is active.

If a known brake system according to DE 10 2009 058 154 A1 implements an external braking demand in the pressure control mode and then detects a control demand for the anti-lock function, i.e. detects reaching or exceeding the slip limit on at least one vehicle wheel, the anti-lock function undertakes control over the adjustment of the brake pressure in the pressure control mode. During the implementation of the external braking demand, the full reservoir pressures are thus available at the pressure control valves on all axles. The adjustment of the brake pressure according to the external braking demand and the corresponding vehicle deceleration is made more difficult, and not least as a result the safety of the braking and the ride comfort are reduced. In particular, it always comes back to an undesirable jerk because of a sudden increase in the brake pressure within the anti-lock function.

SUMMARY

In an embodiment, the present invention provides a method for adjusting brake pressures on pneumatically actuated wheel brakes of a vehicle. The brake pressures on the wheel brakes are adjusted in a normal braking mode as a function of a driver braking demand that is determined by a driver of the vehicle. A brake control unit for implementation of at least one anti-lock function and the driver braking demand independently of external braking demands undertakes adjustment of the brake pressures in a pressure control mode. In the pressure control mode, the brake control unit determines control signals for pressure control valves of the wheel brakes and changes the brake pressures of the wheel brakes involved by actuating the pressure control valves. The method includes, in the normal braking mode, continuously determining, by the brake control unit, at least one differential slip value as a difference between slip values of two wheels or axles of the vehicle, and determining, by the brake control unit, an interaxle braking distribution index for a relevant pair of axles by an assessment of a change in the at least one differential slip value within an evaluation interval. The method further includes, in the pressure control mode, using, by the brake control unit, the interaxle braking distribution index that is determined in the normal braking mode for the weighting of the control signals for the respective pair of axles.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
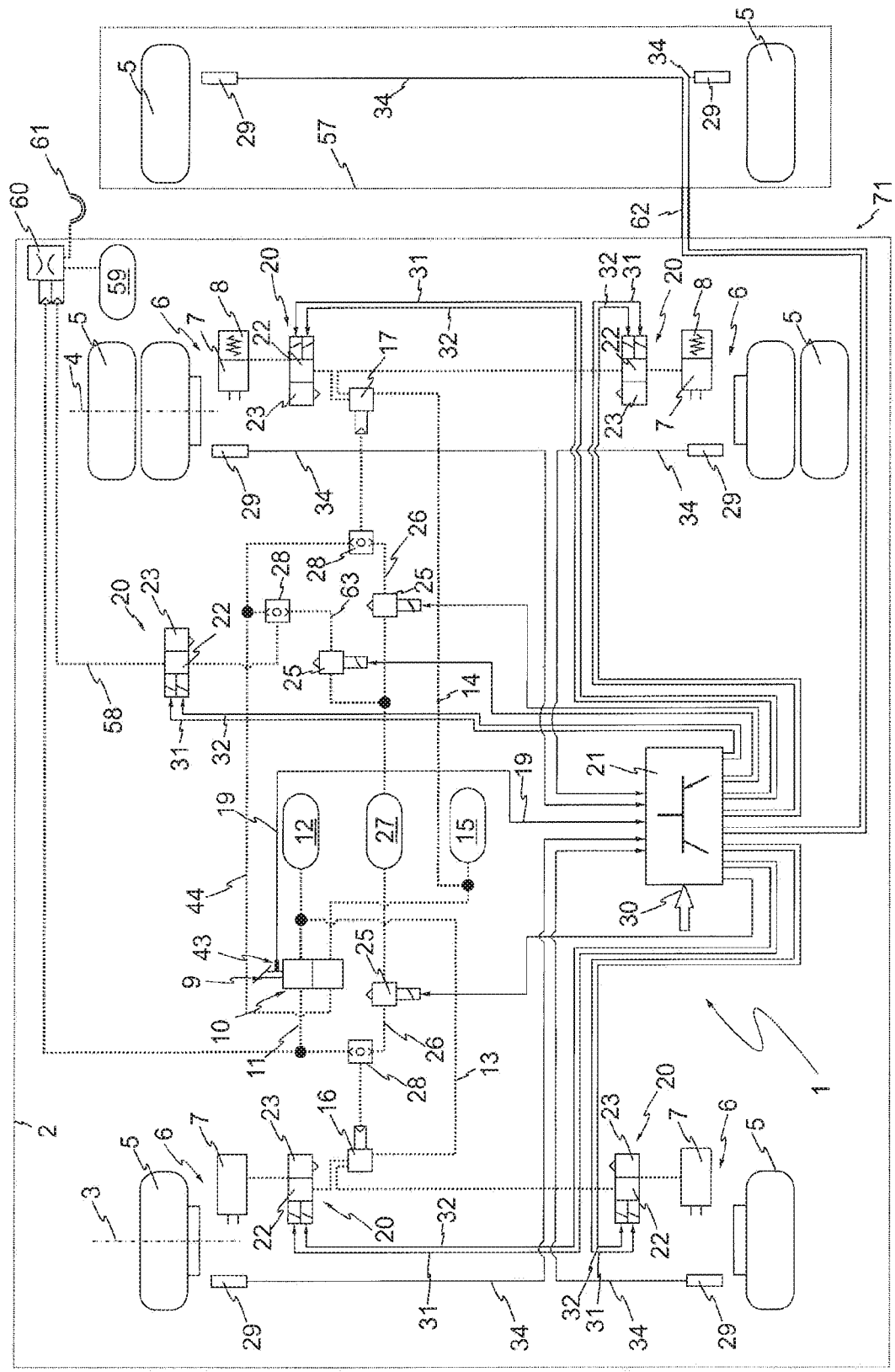
FIG. 1 shows a pneumatic and electrical schema for a brake system of a utility vehicle with a trailer vehicle according to an embodiment of the invention.

Embodiments of the present invention are directed to providing smooth and steady braking behavior during adjustment of brake pressure in a pressure control mode according to an external braking demand.

According to one or more embodiments of the invention, in a normal braking mode a brake control unit determines interaxle braking distribution indices for respective pairs of axles and provides said indices to be subsequently taken into account in the pressure control mode. In this case, a pair of axles means a pair of two axles. In the pressure control mode, the braking distribution indices that are determined in the normal braking mode are used to weight the control signals for the respective pair of axles. The determination of the braking distribution indices is carried out by assessing the change of a differential slip value within an evaluation interval, wherein the differential slip value is determined as the difference between the slip values of two wheels or axles of the vehicle.

According to an embodiment of the invention, a method is provided for adjusting brake pressures in which an ideal braking distribution ratio between two axles in the given circumstances is determined or learnt for normal driver braking, i.e. in the normal braking mode. In this case, given circumstances such as for example the mass of the vehicle or the distribution of the load in the vehicle and hence the accompanying load on the axles and also other influences on the braking behavior, such as for example different brake cylinder sizes and other influences are taken into account. An ideal interaxle distribution ratio is considered to be a ratio whereby a control requirement for an anti-lock function occurs during braking on both axles of a pair of wheels at the same time, or almost at the same time. Owing to the provision of an interaxle braking distribution index for the respective pair of axles according to one or more embodiments of the invention, optimal weighting in respect of an ideal interaxle braking distribution can be achieved in the pressure control mode.

During braking, because of an external braking demand the occurrence of a tendency to lock up because of the high priority of an anti-lock function results in the brake control unit controlling at least one wheel or an axle along the respective slip limit, and thereby the maximum braking force is transferred to the highway until the end of an anti-lock intervention. Because of the high priority of the anti-locking interventions, other functions of brake management are not carried out or are only carried out to a limited extent, for example brake wear control or control of the vehicle deceleration during the braking process. In particular, in the case of a vehicle that is travelling with no or only a low loading with a non-ideal axle load distribution, very often the anti-lock function activates because of corresponding slip values and changes the brake pressure of at least one of the wheel brakes that is tending to lock up.

According to one or more embodiments of the invention, the determination of braking distribution indices and the weighting of the control signals for the pressure control valves of the wheel or axles involved with said braking distribution indices in the pressure control mode improve the axle distribution ratios towards the ideal state and prevent the unwanted intervention of the anti-lock function. An unwanted intervention of the anti-lock function is excluded as long as is actually possible or is carried out as late as is actually possible because of the given physical conditions. All the wheels of the vehicle lock at the same time or almost at the same time.

In an advantageous embodiment of the invention, a change of the current differential slip value of a pair of axles relative to a characteristic value of the differential slip at the starting time of a first evaluation interval is determined in order to establish the braking distribution index. The braking distribution index is quantitatively determined according to the interval-related change of the current differential slip value. In this case, the braking distribution index describes the ratio of the change of the differential slip value in the observed evaluation interval, i.e. during the period of time defined by the evaluation interval. In other words, the braking distribution index is a differential quotient of the change in the differential slip value to the change in the time, i.e. the period of time limited by the evaluation interval, which can be described geometrically by the gradient of a straight line passing through the differential slip values at the starting time and the end time of the evaluation interval. In an advantageous practical implementation of the method, the gradient is determined continually and is combined with the gradient of a corresponding braking distribution index. The slip values of the wheels or axles of the observed pair of axles are determined using measurement signals of revolution rate sensors of the respective wheels.

During the determination of the braking distribution index in quantitative correspondence with the time-related change in the current differential slip value, the time at which the current brake pressure in the wheel brakes exceeds a specified brake pressure threshold value is detected as the starting point of the evaluation interval. In this way, representative braking distribution indices are provided for the pressure control mode while taking into account the slip values determined on the wheel brakes of the pair of axles involved and differential slip values derived therefrom. It is an advantage here that the response pressure of the wheel brakes is taken into account as a threshold value for detecting the starting time of the first evaluation interval. Here the response pressure of the wheel brakes is the value of the brake pressure on the wheel brakes at which the wheel brakes respond and the movable actuators of the wheel brakes are active. The response pressure of the wheel brakes is advantageously determined in advance and specified to the brake control unit.

In a further advantageous embodiment of the invention, the braking distribution index is determined in a second evaluation interval according to a change in the driver's braking demand between the driver's braking demand at the starting time of the second evaluation interval and the driver's braking demand at an end time of the second evaluation interval. In this case, the end time of the evaluation interval in the presence of a differential slip value is assumed to correspond to a specified or determined offset value of the differential slip. During the evaluation interval, the differential slip value of the observed pair of axles is determined continually and the change thereof within the evaluation interval is assessed such that the assessment is ended on reaching the offset value. Advantageously, the differential slip value at the time of reaching the response pressure of the wheel brakes is determined as the offset value. In this case, the response pressure is the value of the brake pressure acting on the wheel brakes at which the wheel brakes start to respond with a braking force.

The determination of the braking distribution index in the second evaluation interval, i.e. based on the change in the driver's braking demand during the evaluation interval, wherein the duration of the evaluation interval depends on and is determined from the change in the differential slip value, is particularly advantageous for braking systems with a brake control unit that carries out electronic braking force distribution. Said procedure for the determination of braking distribution indices is preferably used after the braking force distribution is activated.

In the case of electronic braking force distribution (EBD), the differential slip between the front wheels and the rear wheels or the front axle and one or more rear axles is considered. If the differential slip exceeds a specified stability limit value, then the braking force distribution function of the brake control unit prevents a further pressure rise in the brake cylinders of the rear axle. This is carried out by suitably modifying the control signals for the pressure control valves of the rear axle, in particular of a pressure inlet valve. In the figurative sense, when activating the electronic braking force distribution, the brake control unit locks in the current brake pressure at the rear axle. The brake pressure is limited by the stability limit value specified by the braking force distribution function. During the determination of the braking distribution index while taking into account the activity status of the electronic braking force distribution function, the time of the activation of electronic braking force distribution and the accompanying limiting of the brake pressure at the rear axle is adopted as the starting time of the evaluation interval.

The characteristic value of the differential slip that is used for the determination of the end time of the second evaluation interval for the determination of the braking distribution index based on the change in the driver's braking demand, is advantageously linked to the presence of a defined situation that recurs during each braking operation of the braking process. The characteristic value, which can also be referred to as the offset value, preferably corresponds to the differential slip value at the time at which the driver's braking demand or the increase in the brake pressure accompanying the driver's braking demand is first detected. If the specified slip threshold value, which corresponds to the detected offset value of the differential slip, is not reached during the second evaluation interval, then the driver's braking demand at the end time of the second evaluation interval is determined by extrapolation. In this case, the driver's braking demand at the time of the activation of the electronic braking force distribution and the maximum value detected in the second evaluation interval of the driver's braking demand are taken into account and interpolated towards the expected end time. In other words, the driver's braking demand at the time of the activation of the electronic braking force distribution and the highest detected value of the driver's braking demand in the second evaluation interval are used as supporting points for the determination of an interpolation polynomial and the value of the interpolation polynomial at the expected end time is determined.

In an advantageous embodiment of the invention, inter-axle braking distribution indices are determined for multiple wheels or pairs of axles, taking into account a reference axle in all pairs of axles. The differential axle that is taken into account in all pairs of axles is preferably the front axle.

One or more embodiments of the invention can be especially advantageous for vehicles that are equipped with pneumatically operated wheel brakes. In this case, the vehicle is advantageously a motor vehicle, i.e. a vehicle that is driven by the force of an engine, or a trailer vehicle for motor vehicles. One or more embodiments of the invention can preferably be used for utility vehicles and combination vehicles with a motor vehicle, which is referred to in the combination vehicle as the towing vehicle, and one or more trailer vehicles. A utility vehicle means a motor vehicle that is defined according to the design and equipment thereof for the transport of people or goods or for towing trailer vehicles.

A trailer vehicle can include a dedicated driver assistance system that specifies external braking demands to the brake control unit of the towing vehicle. In the case of a combination vehicle, in which data transmission takes place between the sub vehicles, for example via a CAN interface, the determination of the braking distribution index for the one or more axles of the trailer vehicle is carried out by means of the brake control unit of the towing vehicle. In this case, at least one wheel revolution rate signal, for example a wheel speed of at least one wheel of the trailer vehicle, is transmitted to the brake control unit of the towing vehicle via the CAN interface. The brake control unit of the towing vehicle determines the brake pressure for the wheel brakes of the trailer vehicle and determines braking distribution indices for the axles of the trailer vehicle. In this case, the interaxle braking distribution index of pairs of axles is determined, wherein an axle of the trailer vehicle and a reference axle, i.e. preferably the front axle of the towing vehicle, are considered and are assessed in relation to the interaxle differential slip.

FIG. 1 shows an electrical-pneumatic plan of a brake system 1 of a vehicle 2, namely of a motor vehicle 71 embodied as a utility vehicle that is combined with a trailer vehicle 57 in the exemplary embodiment. Electrical lines are represented with solid lines and pneumatic lines with dotted lines. In the exemplary embodiment shown, the vehicle 2 comprises two axles, namely a front axle 3 and a rear axle 4, on each of which wheels 5 are disposed on both sides. For decelerating the wheels 5, a wheel brakes 6 is associated with each wheel 5. The wheel brakes 6 are pneumatically operated and each comprises a brake cylinder 7. The wheel brakes 6 exert a braking force on the turning wheel 5 according to the respective pneumatic brake pressure applied in the brake cylinder 7. In this case, brake cylinders 7 with spring mechanisms 8 that act as a holding brake are provided on the wheels 5 of the rear axle 4.

A brake pedal 9 that is coupled to a service brake valve 10 is disposed in the driver's cab of the vehicle 2. The driver of the vehicle 2 can switch pneumatic pressure through to the brake cylinders 7 by operating the brake pedal 9 and can thereby actuate the wheel brakes 6. For this purpose, the service brake valve controls 10 pneumatic brake lines 11, 44 between the pressure medium reservoir 12, 15 and the brake cylinders 7.

In the exemplary embodiment shown, the wheel brakes 6 of the front axle 3 are associated with a common first brake circuit 13, whereas the wheel brakes 6 of the rear axle 4 are operated by means of a second brake circuit 14. In this case, the first pressure medium reservoir 12 is associated with the first brake circuit 13 and is connected via the brake line 11 to the brake cylinder 7 of the front axle 3. The second brake circuit 14 of the rear axle 4 is supplied with pressure medium by means of a second pressure medium reservoir 15. The second brake circuit 14 is designed similarly to the first brake circuit 13, i.e. the brake line 44 between the second pressure medium reservoir 15 and the wheel brakes 6 of the rear axle 4 can be opened via the service brake valve 10 and therefore the brake pressure can be adjusted as a function of the position of the brake pedal 9.

A pneumatically operated relay valve 16 is disposed in the first brake circuit 13 and similarly a relay valve 17 is disposed in the second brake circuit 14. The pneumatically operated relay valves 16, 17 are opened by means of the pneumatic pressure from the respective connected pressure medium reservoir 12, 15. If the service brake valve 10 is open, the relay valves 16, 17 switch the prevailing brake pressure through to the connected wheel brakes 6. In a normal braking mode (reference character 18 in FIG. 2), the brake pressure in the wheel brakes 6 can be adjusted as a function of the driver's braking demand (reference character 19 in FIG. 2). In the normal braking mode 18 therefore, the driver of the vehicle 2 has full control over the braking behavior of the vehicle 2 by operating the brake pedal 9.

A pressure control valve 20 is associated with each of the wheel brakes 6 of the brake system 1, said valve being electrically actuated by a brake control unit 21 in a pressure control mode (reference character 24 in FIG. 2) and having a signal transmission connection to the brake control unit 21 for receiving control signals 31, 32. The pressure control valves 20 for the wheel brakes 6 of the front axle 3 are disposed in the first brake circuit 13 and the pressure control valves 20 for the rear axle 4 are disposed in the second brake circuit 14. The pressure control valves 20 are each a combination of at least two solenoid valves, namely an inlet valve 22 and an outlet valve 23. The inlet valve 22 is mainly used to increase pressure or to hold the pressure in the brake cylinder 7, whereas the outlet valve 23 is opened to reduce the brake pressure and vents the respective connected brake cylinder 7. The inlet valve 22 and the outlet valve 23 are 2/2-way valves in the exemplary embodiment.

The brake control unit 21 is designed and configured to automatically affect the braking process in the pressure control mode 24 regardless of the driver's braking demand 19. For this purpose, the brake control unit 21 determines control signals 31, 32 for the pressure control valves 20 based on the information associated therewith in order to adjust the braking behavior of the individual wheel brakes 6. During this, the brake control unit 21 determines control signals 31 for the inlet valves 22 and control signals 32 for the outlet valves 23 and actuates the respective valves with the determined control signals 31, 32. The inlet valves 22 and the outlet valves 23 are controlled in a pulse modulated manner. The control signals 31, 32 therefore correspond to a defined pulse pattern that the brake control unit 21 specifies for the adjustment of a respective brake pressure P.

In the normal braking mode 18, the inlet valves 22 are switched to the open position and the outlet valves 23 are switched to the closed position, so that the adjustment of the brake pressure P is not affected.

In the pressure control mode 24, the brake control unit 21 undertakes the adjustment of the brake pressure of the respective wheel brakes 6 by correspondingly actuating the pressure control valves 20. An electrically operated activation valve 25 is associated with each brake circuit 13, 14, wherein said valve 25 can be operated by the brake control unit 21. Each activation valve 25 is embodied as a 3/2-way valve, whereby the pressure line downstream of the activation valve can be vented as required. In the pressure control mode 24, brake pressure is switched through to the pressure control valves 20 by actuating the activation valves 25. In the exemplary embodiment shown, the activation valves 25 each control a pressure line 26 from a third pressure medium storage device 27 to the relay valves 16, 17. By operating the activation valves 25 of the first brake circuit 13, the relay valve 16 of the front axle 3 can thus be actuated. Similarly, the relay valve 17 of the rear axle 4 is actuated by operating the activation valves 25 of the second brake circuit 14.

The service brake valve 10 and the activation valves 25 are each coupled via a dual non-return valve 28 to the pneumatic control input of the relay valve 16, 17 of the respective brake circuit 13, 14.

The brake system 1 comprises an Anti-lock Braking System, wherein the brake control unit 21 implements the anti-lock function (reference character 33 in FIG. 2) in the pressure control mode 24. Important components for the implementation of the anti-lock function 33 are, besides the brake control unit 21, the pressure control valves 20 of the wheel brakes 6 as actuators of the anti-lock system and revolution rate sensors 29, the measurement signals 34 of which the brake control unit 21 uses for determination of the tendency of the wheels to lock up 5. The brake control unit 21 determines from the measurement signals 34 of the revolution rate sensors 29 information about dynamic state variables of the respective wheels 5, in particular the respective slip (reference character 38 in FIG. 2), in order to conclude therefrom a tendency to lock up by the wheel involved 5. On detecting a tendency to lock up of one or more wheels 5, the brake control unit 21, which is implementing the anti-lock function 33, intervenes in the braking process in the pressure control mode 24 by controlling the brake pressure P at the relevant wheel brakes 6.

By adjusting the brake pressures in the pressure control mode 24, the brake control unit 21 not only implements the internal braking demands, which are specified based on the dynamic state variables of the vehicle that are delivered thereto, but also external braking demands 30. The external braking demand 30 is specified by a driver assistance system. In this case, an external braking demand 30 means the demand for braking power by one or more driver assistance systems or other external systems, which request a braking maneuver because of the function thereof in the vehicle 2. On receiving an external braking demand 30, the brake control unit 21 switches from the normal braking mode 18 to the pressure control mode 24 and undertakes the control or regulation of the brake pressures P at the individual wheels 5.

If the external braking demand 30 is withdrawn, i.e. the brake control unit 21 is no longer receiving an external braking demand 30, then the brake control unit 21 initiates termination of the pressure control mode 24, as long as no further braking demand exists. With the end of the pressure control mode 24, the driver of the vehicle 2 thereby again obtains full control over the operation of the wheel brakes 6 in the normal braking mode 18.

The brake system 1 comprises a brake signal sender 43 that has a signal transmission connection to the brake control unit 21. The output signal of the brake signal sender 43 corresponds quantitatively to the driver's braking demand 19, wherein for example the position or an operating travel of the brake pedal 9, an operating travel of a component of the service brake valve 10 or a brake pressure controlled by the service brake valve 10 can be measured. The brake control unit 21 is sent the driver's braking demand 19 via the signal transmission connection. In this way, the brake control unit 21 is in a position in the pressure control mode 24 to take into account additional driver braking, i.e. an additional driver's braking demand 19 occurring at the same time as the external braking demand 30. The output signal of the brake signal sender 43 provides the brake control unit 21 with quantitative information about the driver's braking demand 19 in the pressure control mode 24. In the exemplary embodiment according to FIG. 2, an internal setpoint deceleration Z-int that is desired by the driver is specified to the brake control unit 21, using which the brake control unit 21 determines and adjusts the corresponding brake pressure P.

The motor vehicle 2 is the towing vehicle of a vehicle combination in which a trailer vehicle 57 or the brake system thereof is connected to the motor vehicle 2. The brake control unit 21 of the motor vehicle 2 has a signal transmission connection to the brake system of the trailer vehicle 57 via a communications connection embodied as a CAN interface 62 in the exemplary embodiment and detects the measurement signals 34 of the revolution rate sensors 29 on the wheels 5 of the trailer vehicle 57 in the exemplary embodiment. In this case, the brake control unit 21 of the towing vehicle directly detects the measurement signals 34 of the revolution rate sensors 29 of the wheels 5 of the trailer vehicle 57.

In further exemplary embodiments, the trailer vehicle 57 comprises a dedicated control unit in addition to the brake control unit of the towing vehicle. The control unit, which is not shown in FIG. 1, of the trailer vehicle 57 transfers the speed signal, for example the trailer vehicle reference speed, to the towing vehicle via the CAN interface 62 between the trailer vehicle 57 and the motor vehicle 2, said speed signal having been determined by a control unit of the trailer vehicle 57 based on all existing measurement signals 34 of revolution rate sensors 29 of the trailer vehicle 57. Alternatively, a trailer vehicle axle speed is determined and transmitted to the brake control unit 21, said speed being the speed of the wheels of a certain selected axle of the trailer vehicle 57. In other words, said axle speed is determined based on the measurement signals 34 of the revolution rate sensors 29 of the relevant axle of the trailer vehicle 57. In this case, the relevant axle of the trailer vehicle 57 is an axle of the trailer vehicle 57 that is representative of the decelerating effect of the trailer vehicle 57. In the case of a fifth wheel trailer, this is advantageously the front axle or in the case of a three-axle semitrailer it is the central axle of the three axles.

A third brake circuit 63 with a fourth pressure reservoir 59 is arranged for activation of the brake system of the trailer vehicle 57. Similarly to the first brake circuit 13 and the second brake circuit 14, the third brake circuit 63 comprises a pressure control valve 20, a dual non-return valve 28 and a 3/2-way valve 25. The pressure control valve 20 of the third brake circuit 63 or the inlet valve 22 and outlet valve 23 thereof can be controlled by the control unit 21. In contrast to the first brake circuit 13 and the second brake circuit 14, a brake pressure line 58 is connected downstream of the pressure control valve 20 to a control valve 60 that controls the connection between the fourth pressure reservoir 59 and a pneumatic coupling head 61. The brake system of the trailer vehicle 57 can be coupled to the coupling head 61. In the exemplary embodiment shown, the brake system of the trailer vehicle 57 is supplied from a fourth pressure reservoir 59 by pilot control of the control valve 60.

The brake control unit 21 of the towing vehicle determines brake pressures for the trailer vehicle 57 and controls the pressure control valves of the wheel brakes of the trailer vehicle 57 by means of control signals 31, 32 corresponding to the wheel brakes 6 of the motor vehicle 2.

Figure 2:
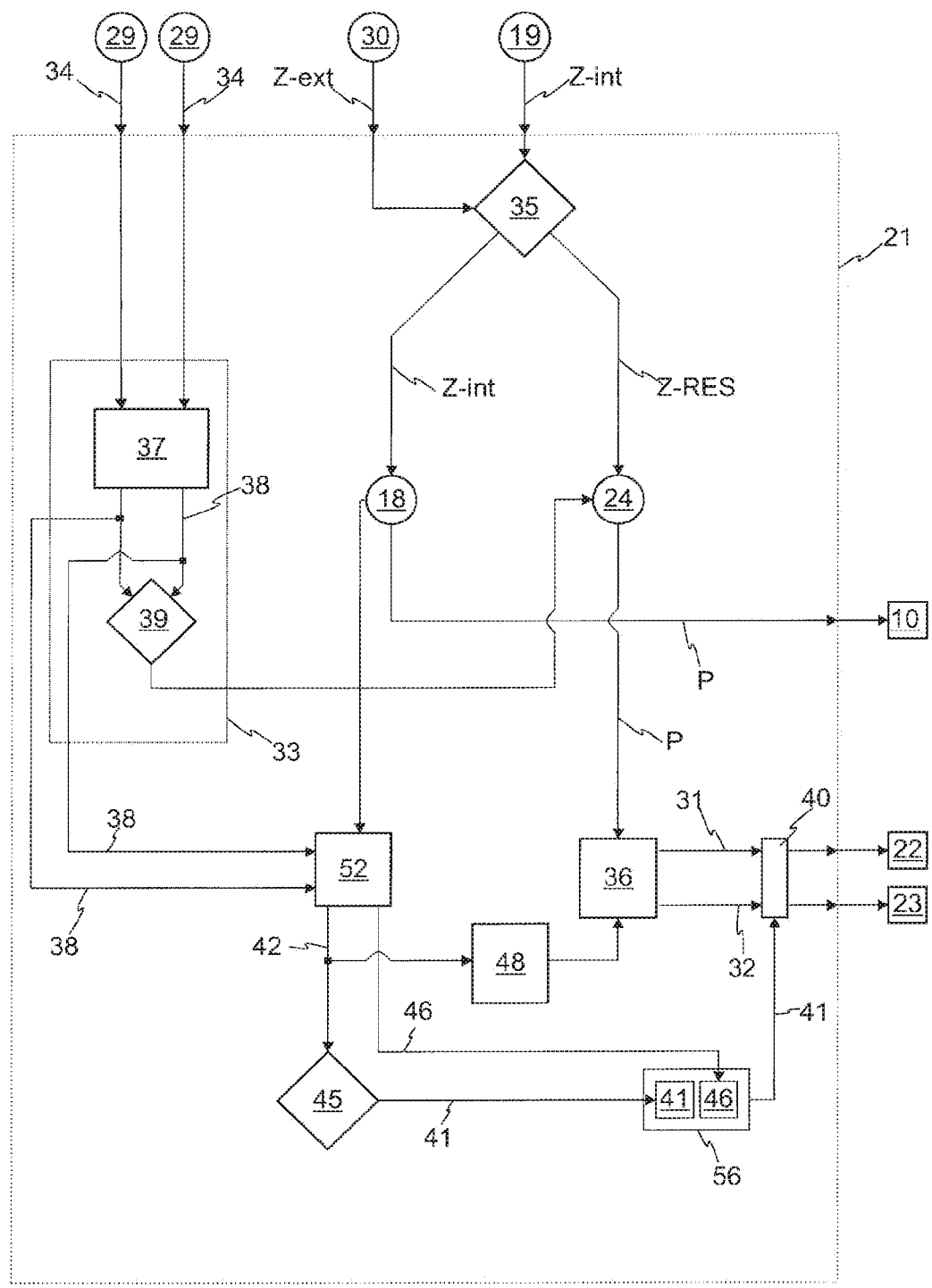
FIG. 2 shows a flow chart of a method according to an embodiment of the invention for adjusting the brake pressures in a brake system according to FIG. 1.
Figure 3:
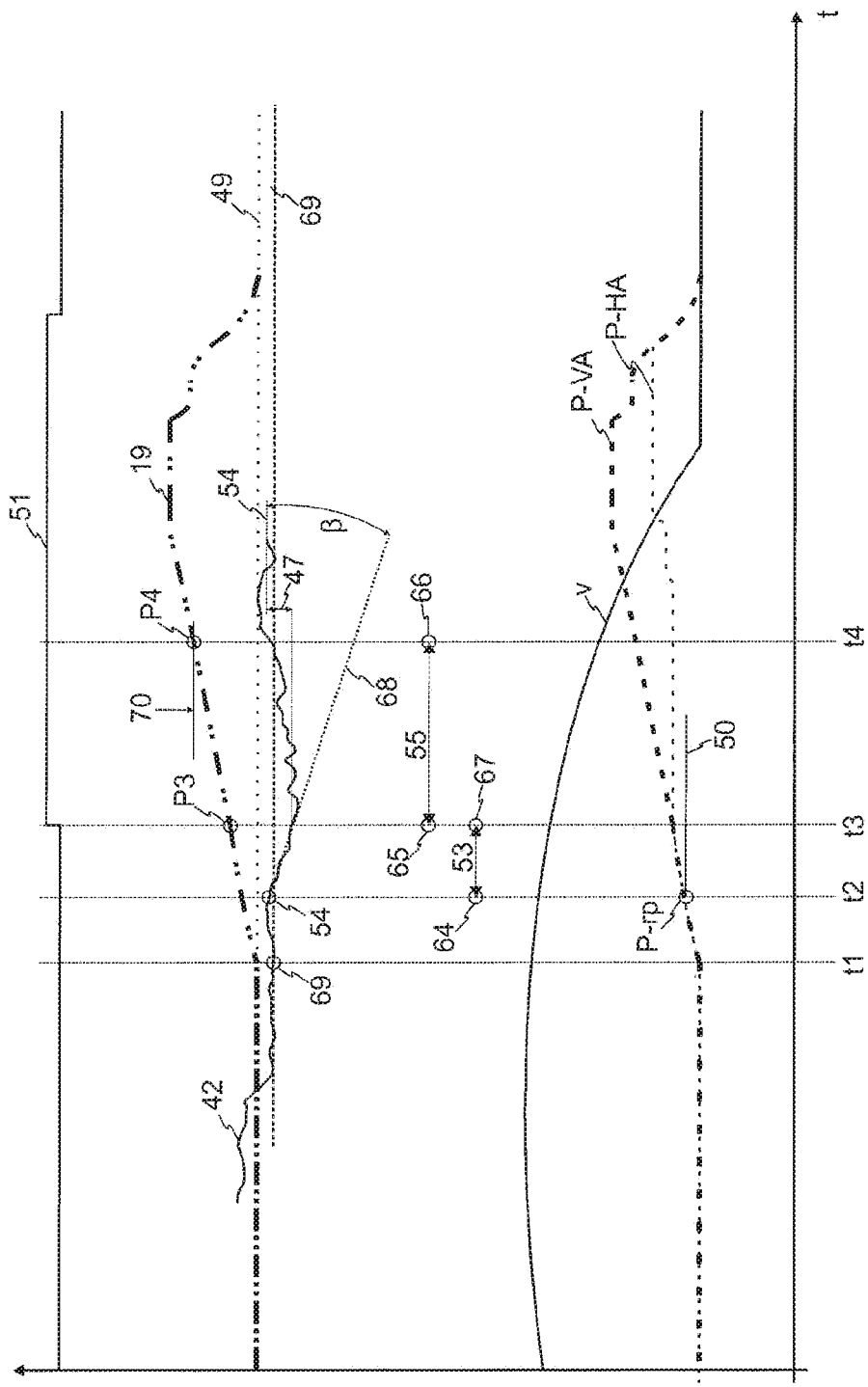
FIG. 3 shows a graphical representation of profiles of variables while carrying out the method according to FIG. 2.

The brake control unit 21 takes into account both the driver's braking demand 19 and the external braking demand 30 in a method for adjustment of the brake pressure P at the wheel brakes 6 that is described below using FIGS. 2 and 3.

In the normal braking mode 18, the brake pressure P is adjusted as a function of the driver's braking demand 19 alone. The driver's braking demand 19 is specified to the brake control unit 21 (FIG. 1) by means of a value representing the driver's braking demand 19. In the exemplary embodiment shown, the value is specified as an internal setpoint deceleration value Z-int. If the driver's braking demand is entered as a different physical variable from the external braking demand 30, then the brake control unit 21 converts the value of said variable into a quantitatively corresponding setpoint deceleration value, so that internal and external braking demands are in the same physical dimension and can be easily combined.

In the normal braking mode 18, the brake system 1 (FIG. 1) adjusts the brake pressure P by operating the service brake valve 10. If the brake control unit 21 receives an external braking demand 30, the brake control unit 21 undertakes the adjustment of the brake pressure in the pressure control mode 24. During a mode detection 35 to decide between the braking modes, the brake control unit 21 takes into account the braking demands that are to be taken into account, namely the driver's braking demand 19 and the external braking demand 30. If there is no external braking demand 30, then the brake pressure P at the wheel brakes is adjusted according to the driver's braking demand 19 in the normal braking mode 18. In the normal braking mode 18, the inlet valves 22 of the pressure control valves 20 remain open and the outlet valves 23 remain closed, whereby the driver of the vehicle 2 has full control over the braking maneuver.

If the brake control unit 21 receives an external braking demand 30, then the brake control unit 21 adjusts a brake pressure P at the wheel brakes 6 in the pressure control mode 24 while taking into account the external braking demand 30 and a possible simultaneous driver's braking demand 19. If there are both an external braking demand 30 and a driver's braking demand 19, for example if the driver is also braking during the pressure control mode 24, then the brake control unit determines the brake pressure P to be adjusted by combining the driver's braking demand 19 and the external braking demand 30 to form a resultant braking demand.

The external braking demand 30 is provided to the brake control unit 21 as an external setpoint deceleration value Z-ext. The internal deceleration value Z-int is combined with the external deceleration value Z-ext to form a resultant deceleration value Z-RES, being added in the exemplary embodiment.

After detecting the braking demands, i.e. either an exclusively external braking demand 30 with a setpoint deceleration value Z-ext or a resultant braking demand from the driver's braking demand 19 and the external braking demand 30, determination 36 of the control signals 31, 32 for the inlet valves 22 or the outlet valves 23 is carried out in order to adjust the brake pressure P according to the specification provided by the brake control unit 21.

The brake control unit 21 analyses the measurement signals 34 of the revolution rate sensors 29 for implementation of the anti-lock function 33, wherein a slip determination 37 is carried out using the measurement signals 34. During the slip determination 37, the respective slip 38 is determined for each wheel 5 of the vehicle 2. An activation step 39 switches to the pressure control mode 24 if the determined slip 38 exceeds a specified slip limit. In this case, the slip limit represents the state of the relevant wheel involved, in which the wheel tends to lock up. During activation 39 of the anti-lock function 33 in the pressure control mode 24, control signals 31, 32 for the inlet valves 22 or the outlet valves 23 are produced and the brake pressure P at the wheel 5 that is tending to lock up is regulated along the slip limit.

In the normal braking mode 18, the brake control unit 21 determines interaxle braking distribution indices 41 for the pairs of axles 46 involved by assessing 45 the change of a differential slip value 42. The braking distribution indices 41 determined in the normal braking mode 18 are stored in a memory element 56 and retained to be subsequently taken into account in the pressure control mode 24. In the pressure control mode 24, the brake control unit 21 uses the interaxle braking distribution index 41 for weighting 40 the control signals 31, 32 for the inlet valves 22 or the outlet valves 23 of the respective pair of axles 46.

For the determination of the braking distribution index 41, the brake control unit 21 continually determines differential slip values, each of which corresponds to the difference of the slips 38 of two axles 3, 4 of the motor vehicle. During the determination of the differential slip values 42, either all slips of the wheels directly or all axle slips are taken into account that represent the mean value of the wheel slips of the left and right wheels of an axle. The information for the respective slip 38 is provided by the anti-lock function 33, which constantly analyzes the measurement signals 34 of the revolution rate sensors 29. During the normal braking mode 18, braking distribution indices 41 are thus learnt for each pair of axles 46 and are used in the pressure control mode 24 for the weighting 40.

The braking distribution index 41 is a weighting factor that brings about the same or essentially the same slip conditions on all axles already from the start of braking because of an external braking demand 30 in the pressure control mode 24, and hence the braking behavior is safer.

In addition to the anti-lock function 33, the brake control unit 21 also implements electronic braking force distribution 48. For this purpose, the brake control unit 21 uses the differential slip value 42 and, on exceeding a specified stability limit value, limits the brake pressure to be controlled at the wheel brakes of the rear axle of the motor vehicle. For this purpose, in particular the control signals 31 for the respective inlet valves 22 are adjusted by the electronic braking force distribution function 48 and a further pressure rise of the brake pressure in the respective brake cylinders of the wheel brakes is prevented.

The determination of the braking performance index 41 is described below using the graphical profiles of relevant variables using FIG. 3. In this case, the quantitative variable on the ordinate axis is shown as a function of the time t on the abscissa axis. In this case, the temporal profile of the respective variable during a braking process of the motor vehicle 2 is shown, wherein the speed of the vehicle v decreases to a standstill because of the braking effect. The braking is initiated by a driver's braking demand 19, which occurs from the time t1, so that the graphical profile of the driver's braking demand 19 rises from the zero line 49. If the differential slip value 42 moves above the zero line 49, then the information can be obtained that the rear axle of the motor vehicle is turning faster relative to the front axle. This is the case if the rear axle d is effectively driven by the drive engine during a drive phase of the motor vehicle or is under-braked relative to the front axle during a braking phase. Conversely, in the case of a differential slip value 42 below the zero line 49, it can be assumed that the rear axle is turning relatively more slowly. This is the case either if a drive engine is coupled to the rear axle but the rear axle is not being driven, so that a frictional torque of the engine is exerting a decelerating effect on the rear axle, and at the same time the rear axle is not yet being braked by the brake system, or the rear axle is being over-braked relative to the front axle during a braking phase.

The brake control unit controls the brake pressure on the wheel brakes with the driver's braking demand 19 from the time t1. In the presence of a driver's braking demand 19 at the time t1, the current differential slip value 42 is kept available as an offset value 69 for the subsequent determination of the braking distribution index 41. The offset value 69 therefore corresponds to the differential slip before the start of the braking or the braking effect. At the time t2, the brake pressure reaches a response pressure P-rp of the wheel brakes, at which the wheel brakes respond under the effect of the brake pressure.

At the time t3, the electronic braking force distribution (reference character 48 in FIG. 2) is active and limits the brake pressure P-HA at the rear axle. This is carried out for example if the differential slip value 42 reaches a specified limit value and/or other criteria for activation are fulfilled. The limiting of the brake pressure P-HA at the rear axle is represented in the graphical representation by the activation status 51 of the electronic braking force distribution 48. In the further course of the braking after the activation of the electronic braking force distribution 48 and limiting of the brake pressure P-HA at the rear axle, the brake pressure P-VA on the front axle increases further with a further increasing driver's braking demand 19.

For the determination of the braking distribution index 41, in a first evaluation interval 53 between the starting time 64 of the first evaluation interval and the end point thereof at a time 67, the change 47 in the current differential slip value 42 relative to a characteristic value 54 of the differential slip at the starting time 64 is determined in relation to the evaluation interval 53, i.e. the period of time defined by the evaluation interval 53. For the determination of the starting time 64 of the first evaluation interval 53, the time t2 is detected at which the brake pressure exceeds a specified threshold value 50. As said threshold value 50, in the exemplary embodiment shown the response pressure P-rp of the wheel brakes is taken into account. At the time t2, if the response pressure P-rp is present at the wheel brakes, the current value of the differential slip 42 is detected as the characteristic value 54 in order to be able to determine the change in the differential slip value 42 during the evaluation interval 53 relative to said characteristic value 54. The change in the current differential slip value 42 relative to the characteristic value 54 that is considered as an offset corresponds graphically to the slope angle β of a straight line 68 that is defined by the characteristic value 54 and the current value of the differential slip value 42 at the end time 67 of the evaluation interval 53. By analysis of the change or the slope angle β of the straight line 68, a variable exists that corresponds quantitatively to the braking distribution index 41. The end time 67 of the first evaluation interval 53 is determined by the time t3 of activation of the electronic braking force distribution.

From the time t3 of activation of the electronic braking force distribution 48 and the accompanying limiting of the brake pressure P-HA at the rear axle, the braking distribution index 41 in a second evaluation interval 55 is determined in a way that differs from the determination of the braking distribution index 41 without brake pressure limiting. During the second evaluation interval 55, the value P3 of the driver's braking demand 19 at the starting time 65 of the second evaluation interval 55 and the value P4 of the driver's braking demand 19 at the end time 66 of the second evaluation interval 55 are used. In this case, the starting time is determined by the time t3 of the limiting of the brake pressure by the activation of the electronic braking force distribution 48.

The end time 66 of the second evaluation interval 55 is adopted as the time t4 at which the differential slip value 42 again reaches the offset value 69 of the differential slip detected before the start of the braking effect at the time t1. The braking distribution index results as the quotient of the value P3 of the driver's braking demand 19 at the starting time 65 (time t3) and the value P4 of the driver's braking demand 19 at the end time 66 (time t4) of the second evaluation interval 55. In this case, in the quotient the value of the response pressure P–rp is subtracted from each of the values P3, P4 to arrive at an accurate and representative braking distribution index 41. The quotient for determination of the braking performance index 41 is thus given by the term (P4–P–rp)/(P3–P–rp).

If the differential slip value 42 does not reach the offset value 69, then an expected value of the driver's braking demand 19 at the end time 66 is adopted by extrapolation with linear interpolation of the driver's braking demand 19 at the time t3 of activation of the electronic braking force distribution and the highest value 70 that is detected of the driver's braking demand 19 towards the expected end time 66 in the second evaluation interval 55, moreover the differential slip value 42 would equal the offset value 69.

The brake control unit determines respective braking distribution indices 41 for different pairs of axles 46 in the normal braking mode 18, which are kept available in a memory element 56 to be taken into account in the pressure control mode 24. In this case, braking distribution indices 41 are each determined relative to a defined reference axle, preferably the front axle of the motor vehicle. For the trailer vehicle 57, accordingly braking distribution indices 41 for the respective axles are each determined relative to the front axle of the motor vehicle.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 brake system
2 vehicle
3 front axle
4 rear axle
5 wheel
6 wheel brakes
7 brake cylinder
8 spring mechanism
9 brake pedal
10 service brake valve
11 brake line
12 pressure medium reservoir
13 first brake circuit
14 second brake circuit
15 second pressure medium reservoir
16 relay valve
17 relay valve
18 normal braking mode
19 driver's braking demand
20 pressure control valve
21 brake control unit
22 inlet valve
23 outlet valve 24 pressure control mode
25 3/2-way valve
26 pressure line
27 third pressure medium reservoir
28 dual non-return valve
29 revolution rate sensor
30 external braking demand
31 inlet valve control signal
32 outlet valve control signal
33 anti-lock function
34 measurement signal
35 mode detection
36 determination
37 slip determination
38 slip
39 activation
40 weighting
41 braking performance index
42 differential slip value
43 brake signal sender
44 brake line
45 assessment
46 pair of axles
47 change
48 electronic braking force distribution
49 zero line
50 threshold value
51 activation status
52 difference determination
53 first evaluation interval
54 reference value
55 second evaluation interval
56 memory element
57 trailer vehicle
58 trailer brake pressure line
59 fourth pressure reservoir
60 control valve
61 coupling head
62 CAN interface
63 third brake circuit
64 starting time
65 starting time
66 end time
67 end time
68 straight line
69 offset value
70 value
71 motor vehicle
P brake pressure
P-VA brake pressure at front axle
P-HA brake pressure at rear axle
P3 value of driver's braking demand
P4 value of driver's braking demand
P-rp response pressure
Z-int internal deceleration value
Z-ext external deceleration value
Z-RES resultant deceleration value
Z-is actual deceleration
t1 time
t2 time
t3 time
t4 time
β slope angle
v speed of the vehicle

The invention claimed is:

1. A method for adjusting brake pressures on pneumatically actuated wheel brakes of a vehicle during a pressure control mode, the method comprising:
   determining, during a normal braking mode, an interaxle braking distribution index by:
      determining, by a brake control unit during at least a portion of the normal braking mode, differential slip values as differences between first slip values of a first wheel or axle of the vehicle and second slip values of a second wheel or axle of the vehicle, and
      determining, by the brake control unit, the interaxle braking distribution index based on a change in the differential slip values during an evaluation interval that occurs during the normal braking mode; and
   determining, by the brake control unit in the pressure control mode, control signals for pressure control valves of the wheel brakes, wherein the control signals are weighted by the interaxle braking distribution index determined during the normal braking mode; and
   adjusting, by the brake control unit in the pressure control mode, the brake pressures of the wheel brakes by actuating the pressure control valves using the control signals for the pressure control valves,
   wherein, in the normal braking mode, the brake pressures on the wheel brakes are determined as a function of a driver braking demand alone, the driver braking demand being determined by a driver of the vehicle.

2. The method as claimed in claim 1, wherein interaxle braking distribution indices are determined, by the brake control unit during the normal braking mode, for multiple pairs of wheels or pairs of axles with an axle that is taken into account for all pairs of wheels or pairs of axles.

3. The method as claimed in claim 1, wherein the adjusting, by the brake control unit in the pressure control mode, the brake pressures of the wheel brakes is carried out as an anti-locking intervention.

4. The method as claimed in claim 1, wherein the determining, by the brake control unit, the interaxle braking distribution index based on a change in the differential slip values during an evaluation interval includes:
   measuring a starting differential slip value at a start time of the evaluation interval,
   measuring an ending differential slip value at an end time of the evaluation interval, and
   determining a gradient of a straight line passing through the starting differential slip value at the start time and through the ending differential slip value at the end time.

5. The method as claimed in claim 4, wherein the start time of the evaluation interval is a time at which a current brake pressure in the wheel brakes during the normal braking mode exceeds a specified brake pressure threshold value.

6. The method as claimed in claim 5, wherein the specified brake pressure threshold value is the value of the brake pressure on the wheel brakes at which the wheel brakes respond and movable actuators of the wheel brakes are active.

7. The method as claimed in claim 1, wherein, in the normal braking mode, the brake pressures on the wheel brakes are not adjusted by the brake control unit.

8. A method for adjusting brake pressures on pneumatically actuated wheel brakes of a vehicle, wherein the brake pressures on the wheel brakes are adjusted in a normal braking mode as a function of a driver braking demand that is determined by a driver of the vehicle, wherein a brake control unit for implementation of at least one anti-lock function and the driver braking demand independently of external braking demands undertakes adjustment of the brake pressures in a pressure control mode, and wherein in the pressure control mode the brake control unit determines control signals for pressure control valves of the wheel brakes and changes the brake pressures of the wheel brakes involved by actuating the pressure control valves, the method comprising:

in the normal braking mode:
continuously determining, by the brake control unit, at least one differential slip value as a difference between slip values of two wheels or axles of the vehicle,
determining, by the brake control unit, an interaxle braking distribution index for a relevant pair of axles by an assessment of a change in the at least one differential slip value within an evaluation interval; and in the pressure control mode:
using, by the brake control unit, the interaxle braking distribution index that is determined in the normal braking mode for the weighting of the control signals for the respective pair of axles, wherein a time-related change in a current value of the at least one differential slip value relative to a characteristic value is determined at a starting time of a first evaluation interval and the interaxle braking distribution index is quantitatively determined according to a time-related change in the current value of the at least one differential slip value, and wherein a time at which a brake pressure exceeds a specified threshold value is detected as the starting time of the first evaluation interval.

9. The method as claimed in claim 8, wherein a response pressure of the wheel brakes is the specified threshold value for detecting the starting time of the first evaluation interval.

10. A method for adjusting brake pressures on pneumatically actuated wheel brakes of a vehicle, wherein the brake pressures on the wheel brakes are adjusted in a normal braking mode as a function of a driver braking demand that is determined by a driver of the vehicle, wherein a brake control unit for implementation of at least one anti-lock function and the driver braking demand independently of external braking demands undertakes adjustment of the brake pressures in a pressure control mode, and wherein in the pressure control mode the brake control unit determines control signals for pressure control valves of the wheel brakes and changes the brake pressures of the wheel brakes involved by actuating the pressure control valves, the method comprising:

in the normal braking mode:
continuously determining, by the brake control unit, at least one differential slip value as a difference between slip values of two wheels or axles of the vehicle,
determining, by the brake control unit, an interaxle braking distribution index for a relevant pair of axles by an assessment of a change in the at least one differential slip value within an evaluation interval; and in the pressure control mode:
using, by the brake control unit, the interaxle braking distribution index that is determined in the normal braking mode for the weighting of the control signals for the respective pair of axles, and wherein the braking distribution index in a second evaluation interval is determined according to a change in the driver braking demand between a value of the driver braking demand at a starting time of the second evaluation interval and a value of the driver braking demand at an end time of the second evaluation interval, wherein the end time of the second evaluation interval is adopted in case of a differential slip value that is equal to a specified or determined offset value.

11. The method as claimed in claim 10, wherein the braking distribution index is quantitatively determined according to a quotient of the value of the driver braking demand at the starting time of the second evaluation interval and the value of the driver braking demand at the end time of the second evaluation interval.

12. The method as claimed in claim 10, wherein during the determination of the braking distribution index in the second evaluation interval, an activity status of an electronic braking force distribution function is taken into account and a time of the activation of the electronic braking force distribution function is adopted as the starting time of the second evaluation interval.

13. The method as claimed in claim 10, wherein a differential slip value at a time, which is before a start of the braking effect of the wheel brakes, is determined as the offset value.

14. The method as claimed in claim 10, wherein the value of the driver braking demand at the end time of the second evaluation interval, at which a differential slip value corresponding to the reference value is adopted, is determined by extrapolation while taking into account the driver braking demand at the time of the activation of the electronic braking force distribution and the highest value of the driver braking demand that is detected in the second evaluation interval and the linear interpolation thereof towards the expected end time with a differential slip value equal to the offset value.

15. A brake system of a vehicle, the brake system comprising:
a brake control unit;
for each wheel of the vehicle, a brake cylinder and a pressure control valve with a signal transmission connection to the brake control unit for the reception of control signals during a pressure control mode; and
a service brake valve that is operated by the driver of the vehicle and a brake signal sender,
wherein the brake control unit is configured to:
determine, during a normal braking mode, an interaxle braking distribution index by:
determining, during at least a portion of the normal braking mode, differential slip values as differences between first slip values of a first wheel or axle of the vehicle and second slip values of a second wheel or axle of the vehicle, and
determining the interaxle braking distribution index based on a change in the differential slip value during an evaluation interval,
determine, in a pressure control mode, control signals for pressure control valves of the wheel brakes, wherein the control signals are weighted by the interaxle braking distribution index determined in the normal braking mode, and
adjust, in the pressure control mode, the brake pressures of the wheel brakes by actuating the pressure control valves using the control signals for the pressure control valves, and
wherein, in the normal braking mode, the brake pressures on the wheel brakes are adjusted as a function of a driver braking demand alone, the driver braking demand being determined by a driver of the vehicle.

16. A vehicle with a brake system as claimed in claim 15.

17. The vehicle as claimed in claim 16, wherein the vehicle is a motor vehicle and/or a trailer vehicle of a motor vehicle.

18. The brake system as claimed in claim 15, wherein the brake control unit is configured to determine the interaxle braking distribution index based on a change in the differential slip values during an evaluation interval by:
- measuring a starting differential slip value at a start time of the evaluation interval,
- measuring an ending differential slip value at an end time of the evaluation interval, and
- determining a gradient of a straight line passing through the starting differential slip value at the start time and through the ending differential slip value at the end time.

19. The brake system as claimed in claim 18, wherein the start time of the evaluation interval is a time at which a current brake pressure in the wheel brakes during the normal braking mode exceeds a specified brake pressure threshold value.

20. The brake system as claimed in claim 19, wherein the specified brake pressure threshold value is the value of the brake pressure on the wheel brakes at which the wheel brakes respond and movable actuators of the wheel brakes are active.

* * * * *